United States Patent
Lestideau

(10) Patent No.: US 7,146,028 B2
(45) Date of Patent: Dec. 5, 2006

(54) FACE DETECTION AND TRACKING IN A VIDEO SEQUENCE

(75) Inventor: Fabrice Lestideau, Manly (AU)

(73) Assignee: Canon Kabushiki Kaisha, Tokyo (JP)

( * ) Notice: Subject to any disclaimer, the term of this patent is extended or adjusted under 35 U.S.C. 154(b) by 679 days.

(21) Appl. No.: 10/410,350

(22) Filed: Apr. 10, 2003

(65) Prior Publication Data

US 2004/0017933 A1   Jan. 29, 2004

(30) Foreign Application Priority Data

Apr. 12, 2002   (AU)   .................................... PS1709

(51) Int. Cl.
*G06K 9/00*   (2006.01)
(52) U.S. Cl. ...................... 382/118; 382/103; 382/154; 382/159; 382/285
(58) Field of Classification Search ................ 382/103, 382/115, 118, 154, 285, 159
See application file for complete search history.

(56) References Cited

U.S. PATENT DOCUMENTS

| | | | |
|---|---|---|---|
| 5,802,220 A * | 9/1998 | Black et al. ................ | 382/276 |
| 5,912,980 A * | 6/1999 | Hunke ......................... | 382/103 |
| 5,987,154 A * | 11/1999 | Gibbon et al. .............. | 382/115 |
| 6,272,231 B1 * | 8/2001 | Maurer et al. .............. | 382/103 |
| 6,445,810 B1 * | 9/2002 | Darrell et al. .............. | 382/115 |
| 6,697,502 B1 * | 2/2004 | Luo ........................... | 382/115 |
| 6,707,933 B1 * | 3/2004 | Mariani et al. ............. | 382/118 |
| 6,760,488 B1 * | 7/2004 | Moura et al. ............... | 382/285 |
| 6,829,384 B1 * | 12/2004 | Schneiderman et al. .... | 382/154 |
| 6,940,545 B1 * | 9/2005 | Ray et al. ................... | 348/222.1 |
| 6,993,163 B1 * | 1/2006 | Liu et al. .................... | 382/118 |
| 7,082,211 B1 * | 7/2006 | Simon et al. ............... | 382/118 |
| 7,099,505 B1 * | 8/2006 | Li et al. ...................... | 382/159 |
| 2001/0031073 A1 | 10/2001 | Tajima ........................ | 382/118 |
| 2004/0017933 A1 * | 1/2004 | Lestideau ................... | 382/118 |

FOREIGN PATENT DOCUMENTS

EP   1 139 270   10/2001

(Continued)

OTHER PUBLICATIONS

"Real-Time Face and Facial Feature Tracking and Applications," Jie Yang, Rainer Stiefelhagen, Uwe Meier, Alex Waibel, Carnegie Mellon University.

(Continued)

*Primary Examiner*—Gregory Desire
(74) *Attorney, Agent, or Firm*—Fitzpatrick, Cella, Harper & Scinto

(57) ABSTRACT

A method (100) and apparatus (700) are disclosed for detecting and tracking human faces across a sequence of video frames. Spatiotemporal segmentation is used to segment (115) the sequence of video frames into 3D segments. 2D segments are then formed from the 3D segments, with each 2D segment being associated with one 3D segment. Features are extracted (140) from the 2D segments and grouped into groups of features. For each group of features, a probability that the group of features includes human facial features is calculated (145) based on the similarity of the geometry of the group of features with the geometry of a human face model. Each group of features is also matched with a group of features in a previous 2D segment and an accumulated probability that said group of features includes human facial features is calculated (150). Each 2D segment is classified (155) as a face segment or a non-face segment based on the accumulated probability. Human faces are then tracked by finding 2D segments in subsequent frames associated with 3D segments associated with face segments.

21 Claims, 9 Drawing Sheets

FOREIGN PATENT DOCUMENTS

| | | |
|---|---|---|
| GB | 2 320 839 | 7/1998 |
| JP | 2001-141425 | 5/2001 |
| WO | 02/07095 | 1/2002 |
| WO | 02/09025 | 1/2002 |

OTHER PUBLICATIONS

"Computer Vision Face Tracking for Use in a Perceptual User Interface," Gary R. Bradski, Intel Corporation.

* cited by examiner

FACE DETECTION AND TRACKING IN A VIDEO SEQUENCE

TECHNICAL FIELD OF THE INVENTION

The present invention relates generally to video processing and, in particular, to the detection and tracking of human faces in a video sequence.

BACKGROUND

Interpretation of a video sequence for human-machine interface purposes is a difficulty often encountered in the image processing industry. Face tracking in particular is one of the most important aspects of such interpretation of video sequences and may be classified as a high level problem, and is often an important initial step in many other applications, including face recognition. Another application is content summarisation, in which an object-based description of the video content is compiled for indexing, browsing, and searching functionalities. Yet another application is active camera control, in which the parameters of a camera may be altered to optimise the filming of detected faces.

Typically, face tracking is divided into two separate steps. First, frames of the video sequence are analyzed to detect the location of one or more faces. When a face is detected, that face is then tracked until its disappearance.

A cue often used in the detection of faces is skin colour. Some known face detection and tracking methods proceed by labelling a detected object having the colour of skin as being a face, and track such objects through time. More sophisticated techniques further analyse each detected object having the colour of skin to determine whether the object includes facial features, like eyes and mouth, in order to verify that the object is in fact a face. However, whilst this technique is fast, such is unreliable. The reason for the unreliability is that skin colour changes under different lighting conditions, causing the skin detection to become unstable.

Other techniques use motion and shape as the main cues. Whenever an elliptical contour is detected within a frame, the object is labelled as a face. Hence, these techniques use a very simple model of the face, that being an ellipse, and assume that the face is moving through the video sequence. Static faces would therefore not be detected.

SUMMARY OF THE INVENTION

It is an object of the present invention to substantially overcome, or at least ameliorate, one or more disadvantages of existing arrangements.

According to a first aspect of the invention, there is provided a method of detecting and tracking human faces across a sequence of video frames, said method comprising the steps of:

(a) forming a 3D pixel data block from said sequence of video frames;

(b) segmenting said 3D data block into a set of 3D segments using 3D spatiotemporal segmentation;

(c) forming 2D segments from an intersection of said 3D segments with a view plane, each 2D segment being associated with one 3D segment;

(d) in at least one of said 2D segments, extracting features and grouping said features into one or more groups of features;

(e) for each group of features, computing a probability that said group of features represents human facial features based on the similarity of the geometry of said group of features with the geometry of a human face model;

(f) matching at least one group of features with a group of features in a previous 2D segment and computing an accumulated probability that said group of features represents human facial features using probabilities of matched groups of features;

(g) classifying each 2D segment as a face segment or a non-face segment based on said accumulated probability of at least one group of features in each of said 2D segments; and (h) tracking said human faces by finding an intersection of 3D segments associated with said face segments with at least subsequent view planes.

According to another aspect of the invention, there is provided an apparatus for implementing the aforementioned method.

According to another aspect of the invention there is provided a computer program for implementing the method described above.

Other aspects of the invention are also disclosed.

BRIEF DESCRIPTION OF THE DRAWINGS

A number of embodiments of the present invention will now be described with reference to the drawings, in which.

DETAILED DESCRIPTION INCLUDING BEST MODE

Figure 1:
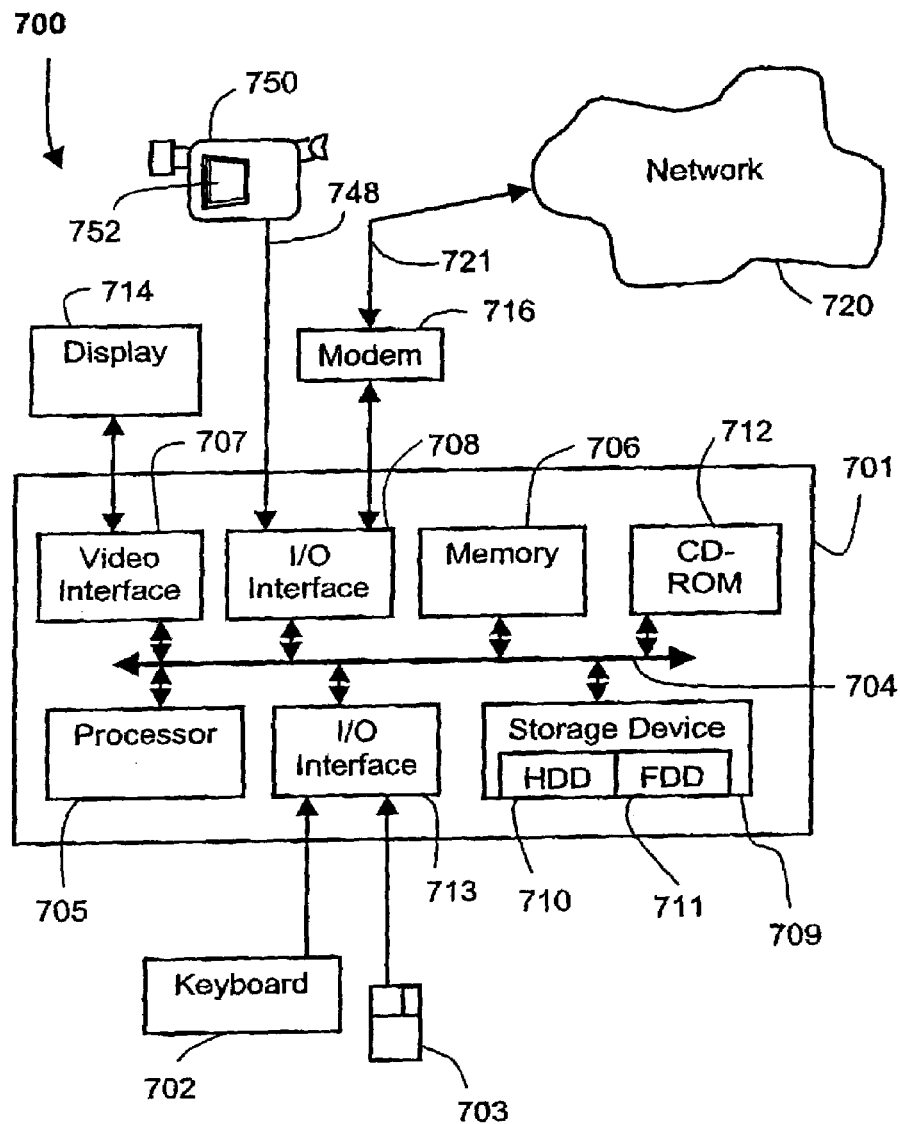
FIG. 1 is a schematic block diagram representation of a programmable device in which arrangements described may be implemented.

Where reference is made in any one or more of the accompanying drawings to steps and/or features, which have the same reference numerals, those steps and/or features have for the purposes of this description the same function (s) or operation(s), unless the contrary intention appears.

Some portions of the description which follows are explicitly or implicitly presented in terms of algorithms and symbolic representations of operations on data is within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities.

Apparatus

FIG. 1 shows a programmable device 700 for performing the operations of a human face detection and tracking method described below. Such a programmable device 700 may be specially constructed for the required purposes, or may comprise a general-purpose computer or other device selectively activated or reconfigured by a computer program stored in the computer or device. The algorithms presented herein are not inherently related to any particular computer or other apparatus.

The programmable device 700 comprises a computer module 701, input devices such as a camera 750, a keyboard 702 and mouse 703, and output devices including a display device 714. A Modulator-Demodulator (Modem) transceiver device 716 is used by the computer module 701 for communicating to and from a communications network 720, for example connectable via a telephone line 721 or other functional medium. The modem 716 can be used to obtain access to the Internet, and other network systems, such as a Local Area Network (LAN) or a Wide Area Network (WAN).

The computer module 701 typically includes at least one processor unit 705, a memory unit 706, for example formed from semiconductor random access memory (RAM) and read only memory (TOM), input/output (I/O) interfaces including a video interface 707, and an 1,0 interface 713 for the keyboard 702 and mouse 703, and an interface 708 for the modem 716 and the camera 750 through connection 748. A storage device 709 is provided and typically includes a hard disk drive 710 and a floppy disk drive 711. A CD-ROM drive 712 is typically provided as a non-volatile source of data. The components 705 to 713 of the computer module 701, typically communicate via an interconnected bus 704 and in a manner which results in a conventional mode of operation of the programmable device 700 known to those in the relevant art.

The programmable device 700 may be constructed from one or more integrated circuits performing the functions or sub-functions of the human face detection and tracking method, and for example incorporated in the digital video camera 750. As seen, the camera 750 includes a display screen 752, which can be used to display a video sequence and information regarding the same.

The method may be implemented as software, such as an application program executing within the programmable device 700. The application program may be stored on a computer readable medium, including the storage devices 709. The application program is read into the computer from the computer readable medium, and then executed by the processor 705. A computer readable medium having such software or computer program recorded on it is a computer program product. Intermediate storage of the program and any data fetched from the network 720 and camera 750 may be accomplished using the semiconductor memory 706, possibly in concert with the hard disk drive 710. In some instances, the application program may be supplied to the user encoded on a CD-ROM or floppy disk and read via the corresponding drive 712 or 711, or alternatively may be read by the user from the network 720 via the modem device 716. The foregoing is merely exemplary of, relevant computer readable mediums. Other computer readable media may be practiced without departing from the scope and spirit of the invention.

The use of the computer program product in the programmable device 700 preferably effects an advantageous apparatus for detecting and tracking human faces across a sequence of video frames.

Human Face Detection and Tracking Method

Figure 2:
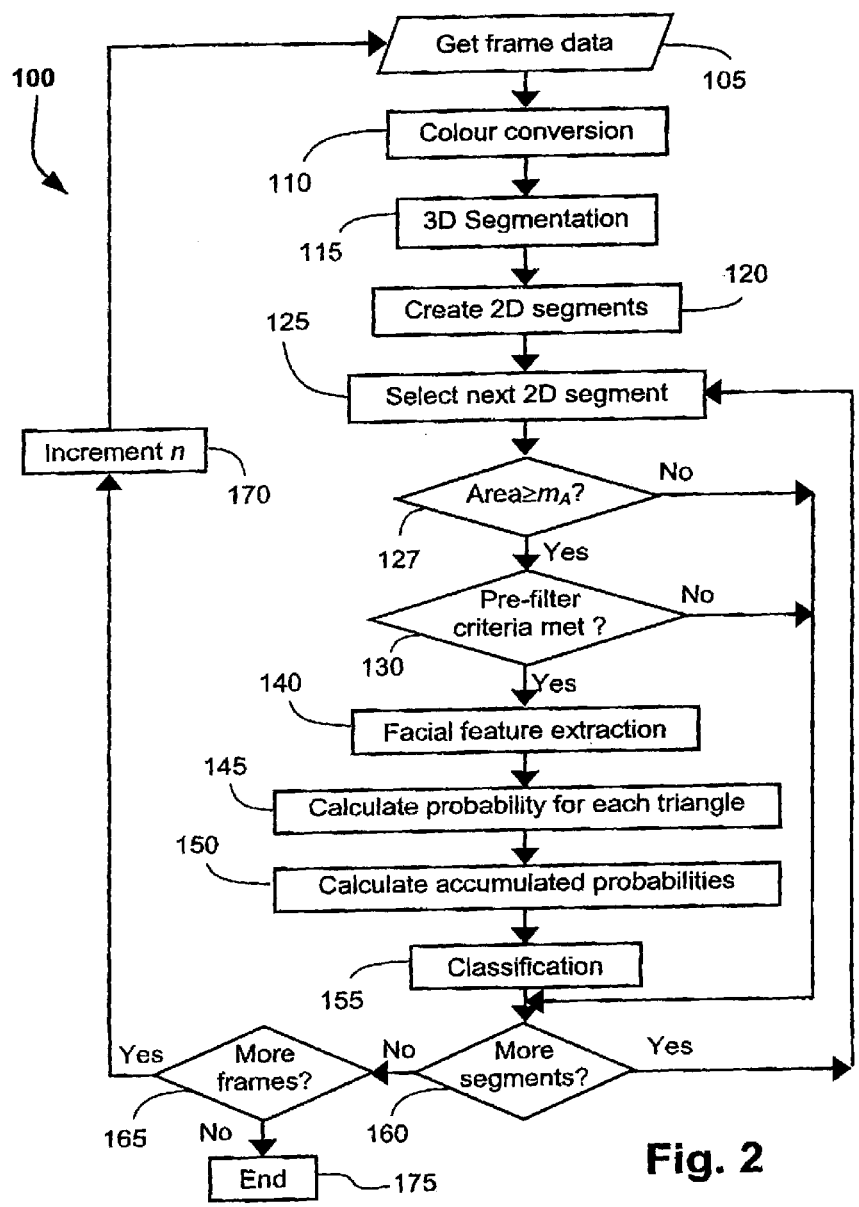
FIG. 2 shows a flow diagram of the main processing steps of a method of detecting and tracking human faces across a sequence of video frames.

FIG. 2 shows a schematic flow diagram of the main processing steps of a method 100 of detecting and tracking human faces across a sequence of video frames. The steps of method 100 are effected by instructions in the application program that are executed by the processor 705 of the programmable device 700 (FIG. 1). The method 100 receives in step 105 at each frame interval n, a two dimensional array of pixel data. The pixel data for each pixel includes colour values $\phi'(x,y,n)$ typically from an image sensor, such as that in camera 750 (FIG. 1). The colour values $\phi'(x,y,n)$ are typically in some colour space, such as RGB or LUV, and may be received directly from camera 750, or may be from a recorded video sequence stored on the storage device 709 (FIG. 1).

The RGB colour space is not particularly suited for segmentation and human skin detection, and the colour values $\phi'(x,y,n)$ are converted into a predetermined colour space in step 110 to form colour values $\phi(x,y,n)$. The predetermined colour space may be CIE Luv, or a combination of colour spaces, which is more suited to segmentation and skin detection.

Step 115 follows wherein the processor 705 performs spatiotemporal (3D) segmentation of the colour values $\phi(x,y,n)$, with time being the third dimension. The segmentation is based on colour, forming contiguous 3D segments $S_i$ of pixels having similar colour.

Any 3D-segmentation algorithm may be used in step 115. In the preferred implementation, the Mumford-Shah 3D-segmentation algorithm is used, the detail of which is described in a later section.

Figure 6:
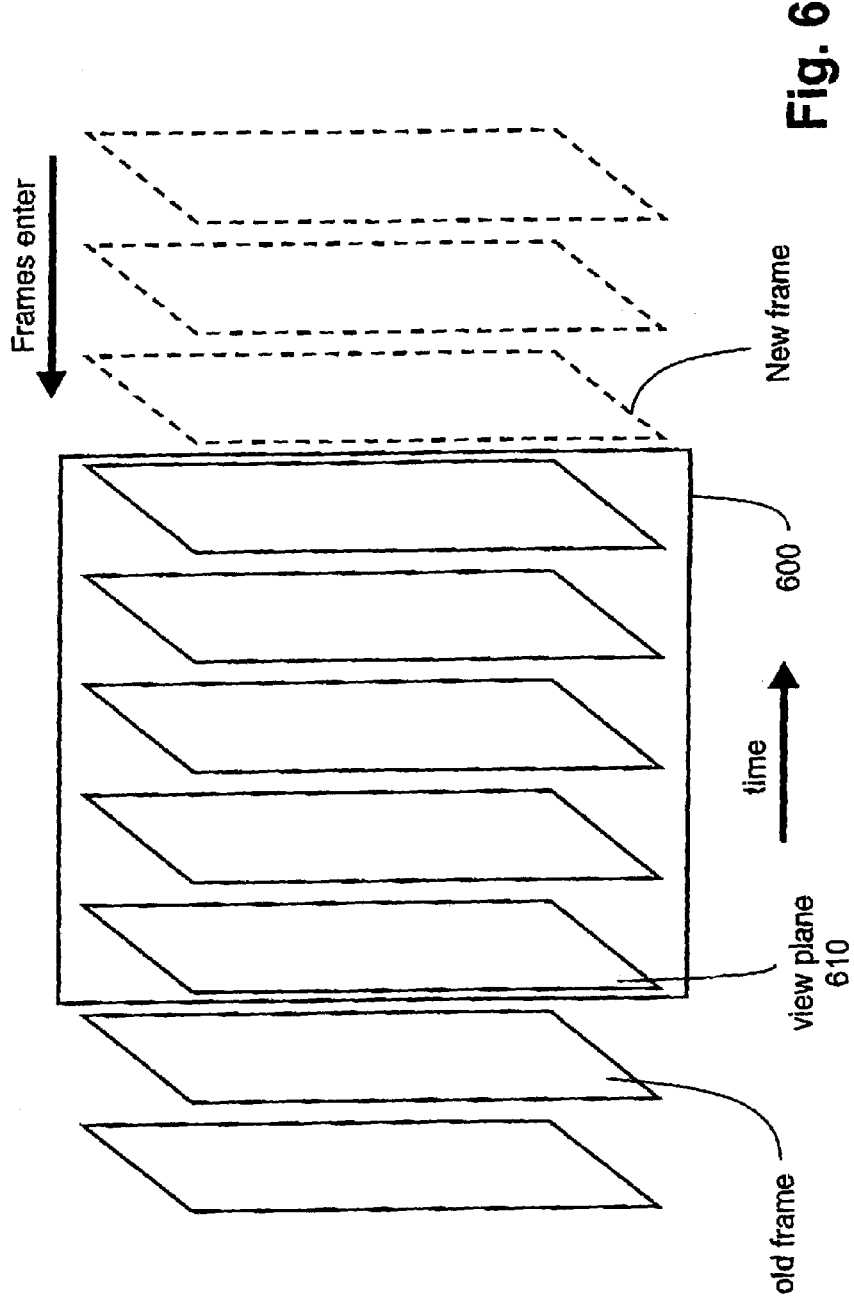
FIG. 6 illustrates a sequence of video frames, with a window including the most recently received frames, forming a "block" of pixel data.

The preferred 3D segmentation uses the colour values $\phi(x,y,n)$ of the L+1 most recently received frames, with L being a fixed, positive non-zero latency of the 3D-segmentation, to produce as output a set of three-dimensional segments $\{S_i\}$ having homogeneous colour. FIG. 6 illustrates a sequence of video frames, with those frames illustrated in phantom being future frames not yet received by the programmable device 700. A window 600 includes the L+1 most recently received frames, forming a "block" of pixel data. The block of pixel data also includes a view plane 610, which is coplanar with the oldest frame in the current window 600 and having been received at frame interval n-L. As new colour values $\phi(x,y,n+1)$ are received in step 105, the new frame is added to the window 600, while the oldest frame in the window 600 is removed from the window 600, thereby maintaining L+1 frames in the window 600.

Referring also to FIG. 2, with the set of 3D segments $\{S_i\}$ foamed, in step 120 the processor 705 "slices through" the 3D segments $S_i$ at frame interval t<n, which typically is the frame interval of the view plane 610 (FIG. 6), to produce 2D segments $s_t^i$. Each 2D segment $s_t^i$ incorporates the pixels at frame interval t that are included in the corresponding 3D segment $S_i$. Hence the 2D segments $s_t^i$ include pixel locations (x,y) satisfying:

$$s_t^i = \{(x,y) : (x,y,t) \in S_i\} \quad (1)$$

The latency L causes a "delay" between the frame index n of the received colour values $\phi'(x,y,n)$ and the frame index t of the 2D segments $s_t^i$ returned by step 120 such that:

$$t = n - L \quad (2)$$

All subsequent processing is carried out on the 2D segments $s_t^i$ at frame interval t.

The method 100 continues to step 125 where the processor 705 selects the next unlabeled segment $s_t^i$ for evaluation. As the segment $s_t^i$ is merely the intersection of 3D segment $S_t$, once a segment $s_t^i$ is labelled as being a human face or not, that label is extended to the corresponding 3D segment $S_t$. Similarly, once the 3D segment $S_t$ has been labeled, all subsequent 2D segments $s_t^i$ associated with that 3D segment $S_t$ receive the same label, and no further evaluation of such segments $s_t^i$ is required.

Step 127 determines whether the area of segment $s_t^i$ is equal to or above a minimum area $m_A$. In the preferred implementation the minimum area $m_A$ is 1500 pixels. If the area of segment $s_t^i$ is smaller than the minimum area $m_A$, then the current segment $s_t^i$ is not evaluated any further and method 100 proceeds to step 160 where it is determined whether there are any more unlabeled segments $s_t^i$ that has not been evaluated. If there are unlabeled segments $s_t^i$ yet to be evaluated, then method 100 returns to step 125 where a next unlabeled segment $s_t^i$ is selected for evaluation.

If the area of segment $s_t^i$ is equal to or above the minimum area $m_A$, then step 130 determines whether the segment $s_t^i$ satisfies a number of pre-filtering criteria. Segments $s_t^i$ not satisfying each of the pre-filtering criteria are likely not to correspond to a human face and may therefore be omitted from further processing. Such pre-filtering is optional and may include criteria such as whether the segment $s_t^i$ selected in step 125 has an elliptical shape, whether the segment $s_t^i$ has the colour of skin, and whether or not the segment $s_t^i$ moves. Step 130 is described in detail in a later section.

If any one of the pre-filtering criteria was not met, then the current segment $s_t^i$ is not evaluated any further and method 100 proceeds to step 160 where it is determined whether there are any more unlabeled segments $s_t^i$ that has not been evaluated.

Figure 3:
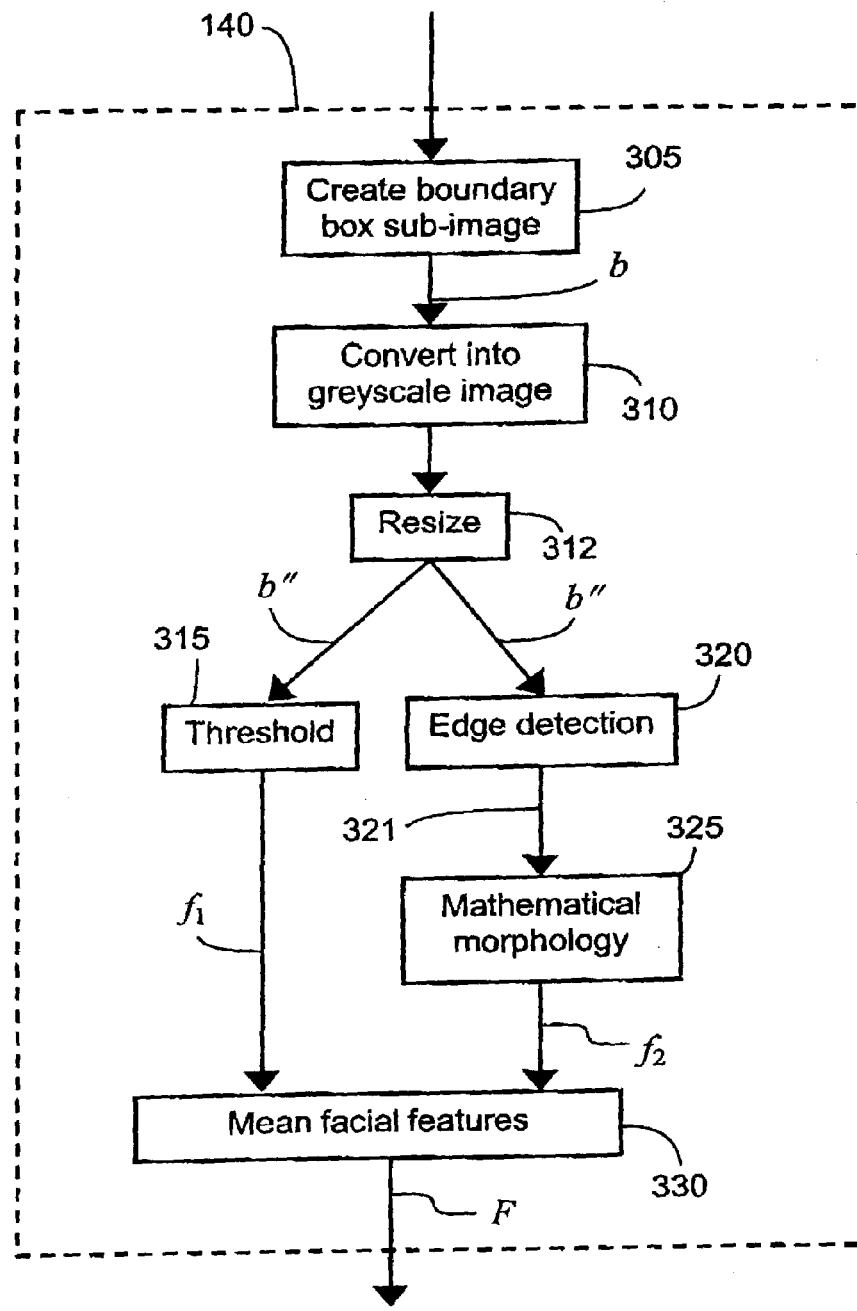
FIG. 3 shows a flow diagram of the sub-steps of the facial feature extraction step.

If the current segment $s_t^i$ met all the pre-filter criteria, then method 100 continues to step 140 where the processor 705 extracts facial features, such as the eyes and the mouth, from the segment $s_t^i$ under consideration. FIG. 3 shows a flow diagram of the sub-steps of the facial feature extraction step 140. Step 140 starts in sub-step 305 by creating a boundary box sub-image b(x,y) of the frame data at frame interval t, with the boundary box sub-image b(x,y) being a rectangular shaped image including the colour values φ(x,y,t) within a bounding box formed around the segment $s_t^i$ being evaluated. Colour is no longer needed and sub-step 310 converts the boundary box sub-image b(x,y) into greyscale image b'(x,y). In order to reduce the computational effort on the processor 705 in the substeps of the facial feature extraction step 140 that follows, the greyscale image b'(x,y) is re-scaled in sub-step 312 such that the area of the segment in the re-scaled greyscale image b"(x,y) (hereinafter simply greyscale image b"(x,y)) is equal to the minimum area $m_A$. The greyscale image b"(x,y) is also stored in memory 706.

The detection of the facial features (the eyes and the mouth) is based on two characteristics of such features. A first is that these features are darker than the rest of the face, and a second is that they give small edges after edge detection. Using these characteristics, two facial feature maps $f_1(x,y)$ and $f_2(x,y)$ are formed from the greyscale image b"(x,y).

The first face feature map $f_1(x,y)$ is formed by applying a threshold in sub-step 315 to the greyscale image b"(x,y), giving a value of "1" to pixels with intensity values lower than a predetermined value and a value of "0" to pixels with intensity values above the predetermined value. Blobs, being defined as dark regions in the first face feature map $f_1(x,y)$, appear where the pixels of the image have an intensity value lower than the threshold.

The second facial feature map $f_2(x,y)$ is formed by first applying in sub-step 320 an edge detection algorithm to the greyscale image b"(x,y) (formed in sub-step 312) to create edges. Any edge detection technique may be used, but in the preferred implementation the Prewitt edge detection technique is used, which may be described as a differential gradient approach. Each of two masks $M_x$ and $M_y$ are convolved with the greyscale image b"(x,y), resulting in a local horizontal and a local vertical gradient magnitude, $g_x$ and $g_y$. The two masks $M_x$ and $M_y$ are given by:

$$M_x = \begin{bmatrix} -1 & 0 & 1 \\ -1 & 0 & 1 \\ -1 & 0 & 1 \end{bmatrix} ; \text{ and} \qquad (3)$$

$$M_y = \begin{bmatrix} -1 & -1 & -1 \\ 0 & 0 & 0 \\ 1 & 1 & 1 \end{bmatrix} \qquad (4)$$

A local edge magnitude is then given by:

$$g = \max(|g_x|, |g_y|) \qquad (5)$$

to which a threshold is applied in order to get a binary edge map 321. In sub-step 325 a dilatation (mathematical morphology) is applied on the binary edge map 321, thereby enlarging the edges, to form facial feature map $f_2(x,y)$.

Finally, a combined facial feature map F(x,y) is formed in sub-step 330 by calculating an average of the two facial feature maps $f_1(x,y)$ and $f_2(x,y)$. By averaging the two facial feature maps $f_1(x,y)$ and $f_2(x,y)$, a more robust feature extraction is achieved. The combined facial feature map F(x,y) is also the output of step 140.

The combined facial feature map F(x,y) includes blobs at positions of possible facial features, with those possible facial features ideally representing the eyes and the mouth. However, the possible facial features may include facial features that are not the eyes and the mouth, with such possible facial features adding some errors. Accordingly, a selection is required to determine which of the possible facial features inside the combined facial feature map F(x,y) have a high probability of corresponding to the eyes and the mouth.

Referring again to FIG. 2, step 140 is followed by step 145 where triangles arm formed from the possible facial features in the combined facial feature map F(x,y), and a probability $\bar{p}_k$ for each triangle is calculated based on the similarity of the geometry of the triangle with the geometry of a human face model, and in particular the geometry of the eyes and the mouth.

Figure 4:
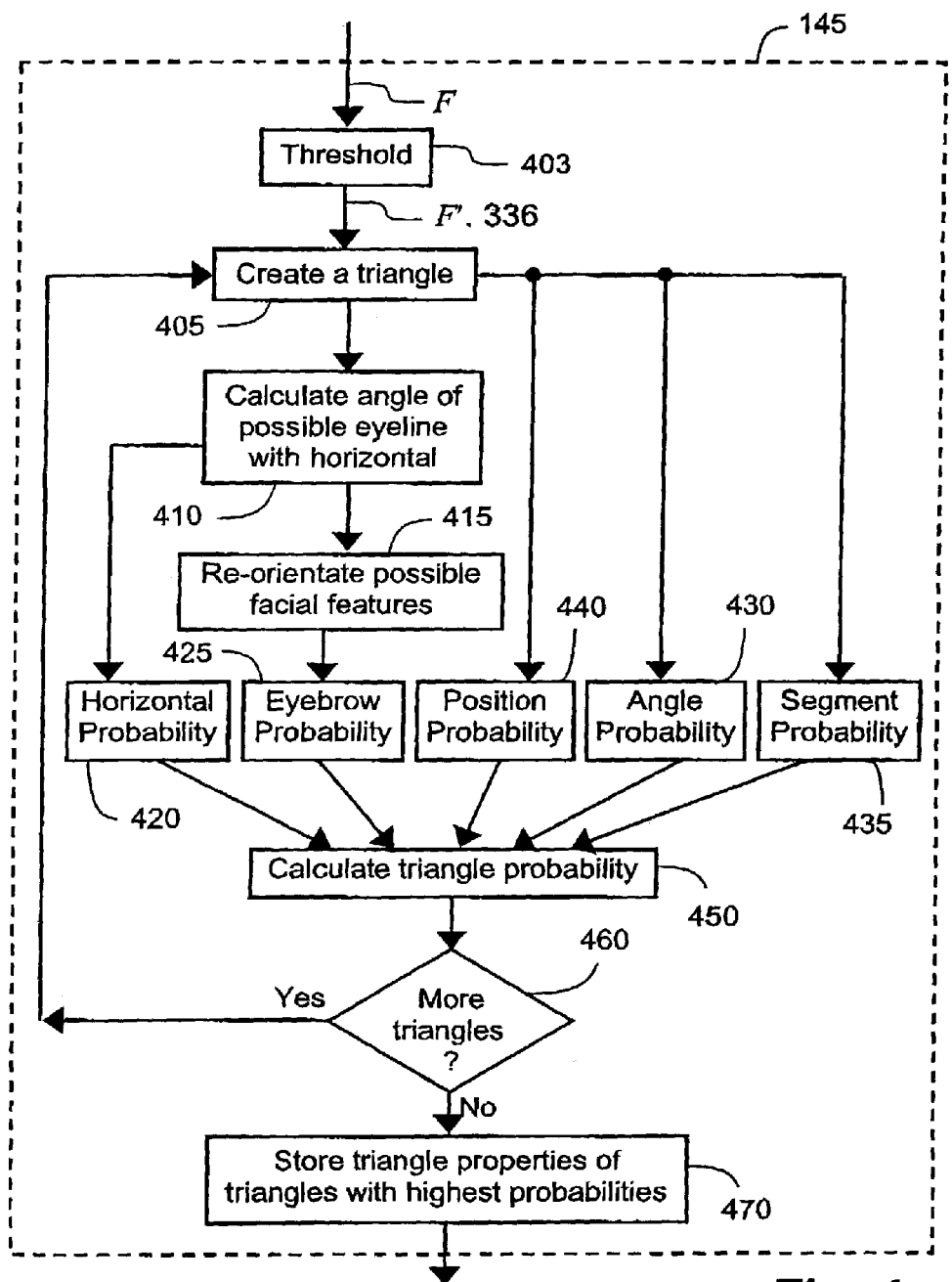
FIG. 4 shows a flow diagram of the sub-steps for calculating a probability for triangles formed in segments.

FIG. 4 shows a flow diagram of the sub-steps of step 145. Step 145 starts in sub-step 403 where a threshold is applied to the combined facial feature map F(x,y) to produce a final facial feature map F'(x,y). The values of the combined facial feature map F(x,y) will be either 0, 0.5 or 1. Therefore, dependent on the threshold, those possible facial features appearing only in one of the two facial feature maps $f_1(x,y)$ and $f_2(x,y)$ will either be included or excluded in the final facial feature map F'(x,y).

In sub-step 405 a triangle is formed from the centroids of three of the possible facial features in the final facial feature map 336. For each such triangle $t_k$, a probability $\bar{p}_k$ is determined that the triangle under consideration includes the true facial features of two eyes and a mouth by evaluating a number of the characteristics of the triangle $t_k$.

Figure 8:
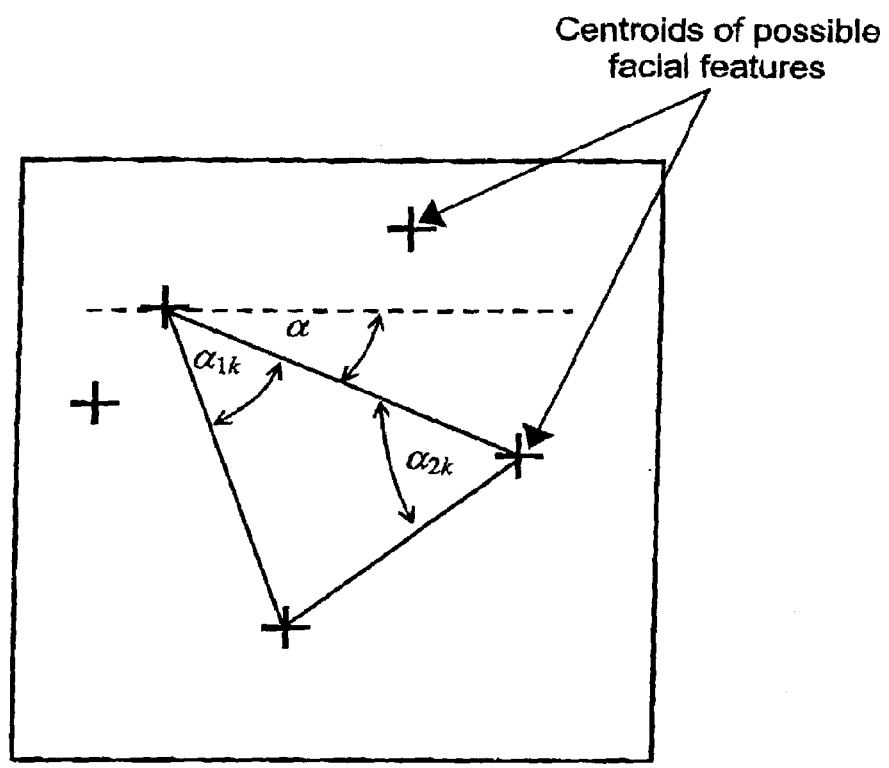
FIG. 8 shows an example of the triangle formed between the centroids of three possible facial features and the angle α that the uppermost line of the triangle makes with the horizontal.

The angle $\alpha$ that the uppermost line of the triangle $t_k$ makes with the horizontal is determined in sub-step 410. FIG. 8 shows an example of the triangle $t_k$ formed between the centroids of three of the possible facial features and the angle $\alpha$ that the uppermost line of the triangle makes with the horizontal. This line is assumed to be the eyeline of the possible facial features represented by the triangle $t_k$. A horizontal probability $p_1$ is determined in sub-step 420 from this angle $\alpha$ for the triangle $t_k$ as follows:

$$p_1 = e^{-2\alpha^1} \qquad (6)$$

Using the angle $\alpha$, the positions of all the centroids are recalculated in sub-step 415 in order to have the uppermost line of the triangle $t_k$ under consideration horizontal. In sub-step 425 an eyebrow probability $p_2$ is then calculated for the two possible facial features assumed to be the eyes, by determining whether there are other possible facial features situated within a window above those possible eye facial features. As eyebrows have similar properties to that of eyes, the eyebrow probability $p_2$ of a triangle $t_k$ which includes eyes, would be higher than that including the eyebrows. Let d be the distance between the two possible eyes (or length of cycline), and $\xi_i$ the vector joining the possible eye facial feature j and a possible facial feature i above it. The eyebrow probability $p_2$ may then be calculated for each possible eye as follows:

$$p_{2j} = \begin{cases} 1 & \text{if } \xi_{ix} < \frac{d}{5} \ \& \ |\xi_{iy}| < \frac{2*d}{5} \\ 0 & \text{else} \end{cases} \qquad (7)$$

with $\xi_{ix}$ being the vertical component of the vector $\xi_i$ and $\xi_{iy}$ being the horizontal component of the vector $\xi_i$. This test is repeated for each facial feature i above a possible eye facial feature j, and a probability of one is given to the eyebrow probability $p_{2j}$ of possible facial feature j if at least one facial feature i gives a probability of one.

The eyebrow probability for the triangle $t_k$ is given by:

$$p_2 = \frac{1}{2} \sum_{j=1}^{2} p_{2j} \qquad (8)$$

Considering the angles $\alpha_1$ and $\alpha_2$ formed at the possible eye facial features of the triangle $t_k$, experimental results have shown that these angles $\alpha_1$ and $\alpha_2$ range between 0.7 and 1.4 radians for triangles of real faces. These angles $\alpha_1$ and $\alpha_2$ are also illustrated in FIG. 8. An angle probability $p_3$ is determined in sub-step 430 from the angles $\alpha_1$ and $\alpha_2$ of the triangle $t_k$ as follows:

$$p_{\alpha_j}(\alpha_j) = \begin{cases} 0 & \text{if } \alpha_j \leq 0.5 \ \& \ 1.7 \leq \alpha_j \\ 2.5*\alpha_j - 1.25 & \text{if } 0.5 < \alpha_j < 0.9 \\ -2.5*\alpha_j + 4.25 & \text{if } 1.3 < \alpha_j < 1.7 \\ 1 & \text{if } 0.9 < \alpha_j < 1.3 \end{cases} \qquad (9)$$

with $p_3 = \frac{p_{\alpha 1} + p_{\alpha 2}}{2} \qquad (10)$

Ideally, a facial feature should be detected in each of the facial feature maps $f_1(x,y)$ and $f_2(x,y)$ (FIG. 3). Therefore, the mean of the facial feature maps $f_1(x,y)$ and $f_2(x,y)$, which was determined in sub-step 330 (FIG. 3) as the combined facial feature map F(x,y), provides another measure of whether the facial features of the triangle $t_k$ are true facial features. Therefore a segment probability $p_4$ calculated in sub-step 435 is given by:

$$p_{4j} = \frac{1}{\eta_j} \sum_{l=1}^{\eta_j} \rho_l \qquad (11)$$

$$\text{and } p_4 = \frac{1}{3} \sum_{j=1}^{3} p_{4j} \qquad (12)$$

$\eta_j$: number of pixels in the facial feature segment j.

$\rho_l$: grey value of pixel l of possible facial feature j from the combined facial feature map F(x,y).

The relative position of the triangle $t_k$ inside the bounding box sub-image b(x,y) gives position probability $p_5$, which is calculated in sub-step 440. Experimental results have shown that the eyes are most often situated at the top of such a boundary box sub-image b(x,y). Position probability $p_5$ takes into consideration the position of the highest of the possible eyes in probability $p_{51}$ and the distance between the possible eyes in relation to the width of the boundary box sub-image b(x,y) in probability $p_{52}$ as follows:

$$p_{51} = \begin{cases} 1 & \text{if } X_c < \frac{2*Y}{3} \\ -\frac{3*Y_c}{Y} + 3 & \text{elsewhere} \end{cases} \qquad (13)$$

$$p_{52} = \begin{cases} 1 & \text{if } e < \frac{Y}{2} \ \& \ e > \frac{Y}{4} \\ \frac{-4*e}{Y} + 3 & \text{if } e > \frac{Y}{2} \ \& \ e < \frac{3*Y}{4} \\ \frac{4*e}{Y} & \text{if } e < \frac{Y}{4} \\ 0 & \text{else} \end{cases} \qquad (14)$$

$$p_5 = \frac{p_{51} + p_{52}}{2} \qquad (15)$$

with $X_c$ is the x-axis coordinate of the highest possible eye facial feature of the triangle $t_k$;

Y is the width of the boundary box sub-image b(x,y); and e is the distance between the two possible eye facial features.

The probability $\overline{p}_k$ of a triangle $t_k$ to be a true facial feature triangle is calculated and stored in sub-step 450, and is given by:

$$\overline{p}_k = \sum_{l=1}^{5} \pi_l * p_l \qquad (16)$$

with $\pi_i$ being predetermined probability weight factors $$\left( \sum_i \pi_i = 1 \right)$$

In the preferred implementation, the predetermined probability weight factors are $\pi_1=0.2$, $\pi_2=0.1$, $\pi_3=0.1$, $\pi_4=0.5$, and $\lambda_5=0.1$.

Sub-step 460 determines whether there are more triangles $t_k$ to be considered. If there are more triangles $t_k$, substeps 405 to 455 are repeated for a next triangle $t_k$. Alternatively, with all the triangles $t_k$ in the 2D segment $s_n^i$ having a probability $\bar{p}_k$ of being a facial feature triangle assigned, a predetermined number of those triangles $t_k$ that have the highest probabilities $\bar{p}_k$ are stored in step 470, after which step 145 ends. In particular, the angles $\alpha_{1k}$ and $\alpha_{2k}$ formed between the "eyeline" and the other two sides (from left to right) and the positions $(x_{1k}, y_{1k})$, $(x_{2k}, y_{2k})$ and $(x_{3k}, y_{3k})$ of the three centroids forming the corners of the triangle $t_k$ (starting from the upper left corner and proceeding clockwise) are stored.

Referring again to FIG. 2, step 145 is followed by step 150 where the processor 705 uses the stored properties of the triangles $t_k$ to match the triangles $t_k$ with a feature triangle $T_j$ of the 3D segment $S_i$, and to accumulate the probabilities $\bar{p}_k$ in subsequent frames into an accumulated probability $P_j$ for each such feature triangle $T_j$, until a sufficiently strong accumulated probability $P_j$ is available on which to make robust classification decisions. In the preferred implementation, a maximum number $N_{max}$ of feature triangles to be stored is set to 10. The 3D segmentation (step 115) allows this accumulation of the probabilities $\bar{p}_k$ to occur over the temporal history of each segment $S_i$.

Figure 5:
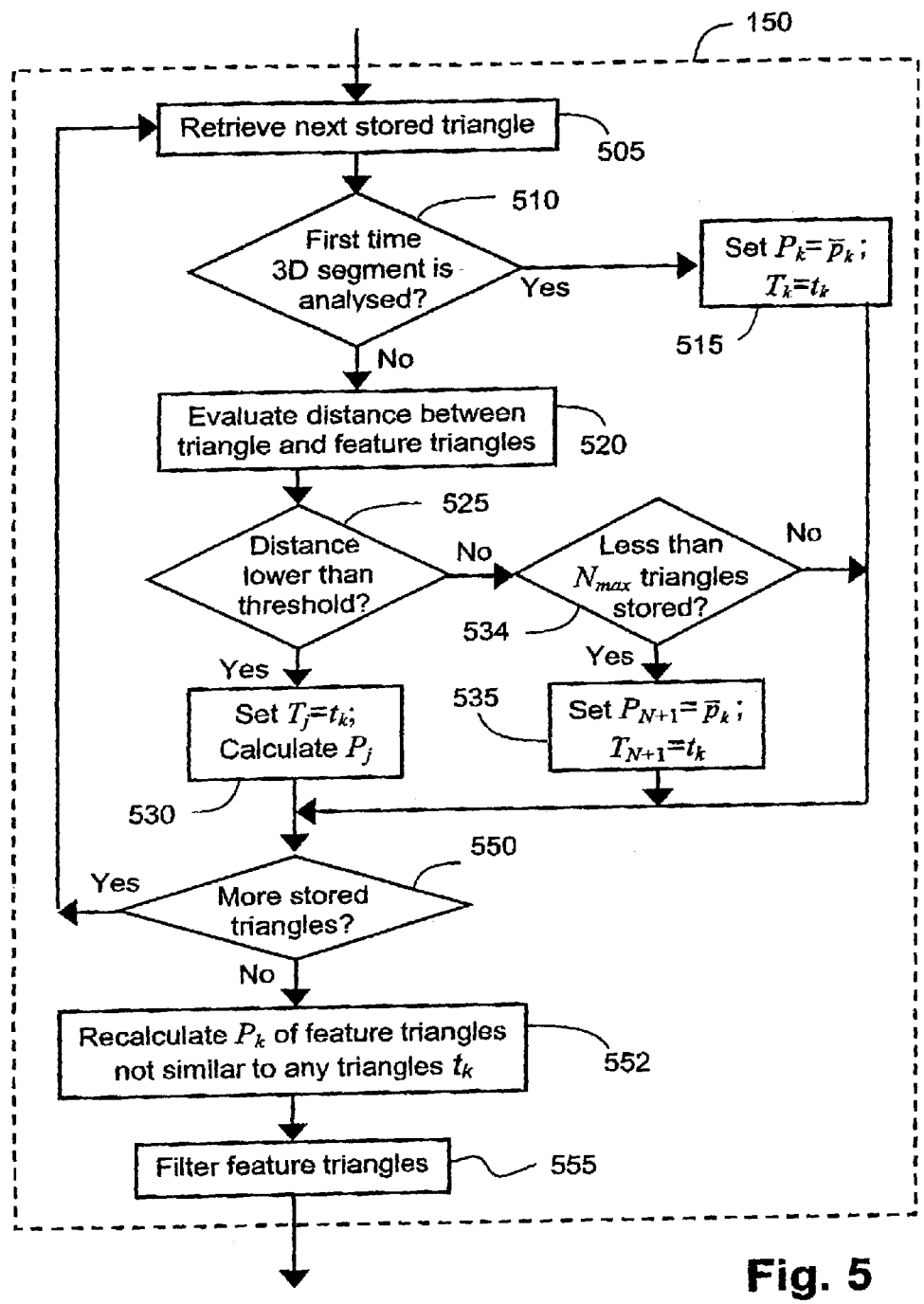
FIG. 5 shows a flow diagram of the sub-steps for calculating an accumulated probability.

FIG. 5 shows a flow diagram of the sub-steps of step 150. Step 150 starts in sub-step 505 where a next stored triangle $t_k$ is retrieved from the storage device 709. Sub-step 510 determines whether it is the first time that 3D segment $S_i$, of which segment $s_n^i$ is an intersection, is being analysed. If sub-step 510 determines that it is the first time that 3D segment $S_i$ is being analysed, then the properties of that triangle $t_k$ are retained in sub-step 515 as feature triangle $T_k$ and the accumulated probability $P_k$ of feature triangle $T_k$ is set to that of triangle $t_k$, ie. $\bar{p}_k$. Step 150 then proceeds to sub-step 550 where it is determined whether there are any more stored triangles $t_k$ that are to be evaluated by step 150.

If sub-step 510 determines that it is not the fit time that 3D segment $S_i$ is being analysed, then sub-step 520 evaluates a distance $D(T_l, t_k)$ between the triangle $t_k$ under consideration and each of the feature triangles $T_l$. The distance $D(T_l, t_k)$ is given by:

$$D(T_l, t_k) = \sum_{c=1}^{3}(x_{cl} - x_{ck})^2 + \sum_{c=1}^{3}(y_{cl} - y_{ck})^2 + \sum_{c=1}^{2}(\alpha_{cl} - \alpha_{ck})^2 \quad (17)$$

Sub-step 525 then determines whether the lowest of the distances $D(T_l, t_k)$ is lower than a predetermined threshold. If the lowest of the distances $D(T_l, t_k)$ is lower than the predetermined threshold, then the triangle $t_k$ under consideration is sufficiently similar to feature triangle $T_l$ to be that feature triangle in the current frame. Accordingly, in sub-step 530 that feature triangle $T_l$ is set to be triangle $t_k$ and its accumulated probability $P_l$ is set to:

$$P_l = \frac{\frac{P_l + \bar{p}_k}{2} + \frac{Nd_l}{T\_life} + \frac{Nd_l}{S\_life}}{3} \quad (18)$$

wherein: $Nd_l$ is the number of times the feature triangle $T_l$ has been detected through time, T_life is the lifetime of the feature triangle $T_l$, which is the difference between the current frame index t and the frame index of the frame where feature triangle $T_l$ first appeared;

S_life is the life time of the segment $S_i$ under consideration, which is the difference between the frame index t and the frame index of the frame where 3D segment $S_i$ first had at least one feature triangle $T_k$ detected.

If sub-step 525 determines that the lowest of the distances $D(T_l, t_k)$ is not lower than the predetermined threshold, then the triangle $t_k$ under consideration is not sufficiently similar to any one of the feature triangles $T_l$. If sub-step 534 determines that the number of stored feature triangles is lower than the number $N_{max}$, the properties of that triangle $t_k$ are then retained in sub-step 535 as feature triangle $T_{N+1}$, and the accumulated probability $P_{N+1}$ of feature triangle $T_{N+1}$ is set to that of triangle $t_k$, ie. $\bar{p}_k$. From sub-step 534 or sub-step 535, step 150 proceeds to sub-step 550 where it is determined whether there are any more stored triangles $t_k$ that has to be evaluated by step 150. If more triangle $t_k$ remain to be evaluated, then step 150 returns to sub-step 505.

If all triangles $t_k$ have been processed, then sub-step 552 recalculates the accumulated probabilities $P_l$ of the feature triangles $T_l$ that has not been found similar to any of the triangles $t_k$ as:

$$P_l = \frac{\frac{P_l}{2} + \frac{Nd}{T\_life} + \frac{Nd_l}{S\_life}}{2} \quad (19)$$

Step 150 then proceeds to sub-step 555 where a number of the feature triangles $T_l$ are discarded. In particular, if the accumulative probability $P_l$ of triangle $T_l$ becomes lower than a predetermined threshold, such as 0.5, and the lifetime T_life of the feature triangle $T_l$ is higher than another predetermined threshold, such as 6, then such a feature triangle $T_l$ is discarded.

Referring again to FIG. 2, method 100 uses the accumulated probabilities $P_l$ of the feature triangles $T_l$ in step 155 for classifying the 2D segment $s_t^i$, and also its associated 3D segment $S_i$, as a human face if at least one of the accumulated probabilities $P_l$ is higher than a predetermined threshold, such as 0:75, and the life time T_life of that feature triangle $T_l$ is higher than another predetermined threshold, such as 3. 3D segment $S_i$ is assigned a face label and will retain that label for the duration of that segment $S_i$.

Next step 160 determines whether there are any more unlabeled segments $s_t^i$ that have not been evaluated If there are unlabeled segments $s_t^i$ yet to be evaluated, then method 100 returns to step 125 where a next unlabeled segment $s_t^i$ is selected for evaluation. If all unlabeled segments $s_t^i$ have been evaluated, then step 165 determines whether there are more frames in the video sequence. If more frames exist, then method 100 proceeds to step 170 where the frame index n is incremented before method 100 proceeds to step 105 where the two dimensional array of pixel data of the next frame is received. Alternatively method 100 ends in step 175.

3D Segmentation

The spatiotemporal (3D) segmentation of the video data based on colour performed by the processor 705 in step 115 (FIG. 2) will now be described in more detail. The segmentation step 115 segments the three-dimensional block of pixel data of the L+1 most recently received frames into a set of three-dimensional segments $\{S_i\}$, so that every pixel in the block is related to one segment $S_i$ in which all pixels belonging to the same segment $S_i$ have homogeneous colour values $\phi(x,y,n)$.

An assumption underlying the segmentation problem is that each colour value $\phi(x,y,n)$ is associated with a particular state. The model used to define the states is decided upon in advance. Each state is defined by an unknown segment model parameter vector $\overline{\alpha}_i$ of length c, with each state being assumed to be valid over the contiguous 3D segment $S_i$. The aim of segmentation is to identify these 3D segments $S_i$ and the model parameters $\overline{\alpha}_i$ for each segment $S_i$.

A model vector of measurements $\gamma(x,y,n)$ over each segment $S_i$ is assumed to be a linear projection of the c-vector model parameter $\overline{\alpha}_i$ for that segment $S_i$:

$$\gamma(x,y,n)=A(x,y,n)\overline{\alpha}_i, \ (x,y,n) \in S_i \quad (20)$$

where $A(x,y,n)$ is an m by c matrix, which relates the state of segment $S_i$ to the model measurements $\gamma(x,y,n)$, thereby encapsulating the nature of the predefined model. In the colour video segmentation case, c=m and matrix $A(x,y,n)$ is the c by c identity matrix for all $(x,y,n)$.

Each vector of actual colour values $\phi(x,y,n)$ is subject to a random error $e(x,y,n)$ such that $$\phi(x,y,n)=\gamma(x,y,n)+e(x,y,n) \quad (21)$$

Further, the error $e(x,y,n)$ may be assumed to be drawn from a zero-mean normal (Gaussian) distribution with covariance $\Lambda(x,y,n)$:

$$e(x,y,n) \sim N(0, \Lambda(x,y,n)) \quad (22)$$

wherein $\Lambda(x,y,n)$ is a c by c covariance matrix. Each component of the error $e(x,y,n)$ is assumed to be independently and identically distributed, i.e.:

$$\Lambda(x,y,n)=\sigma^2(x,y,n)I_c \quad (23)$$

where $I_c$ is the c by c identity matrix.

Variational segmentation requires that a cost function E be assigned to each possible segmentation. The cost function E used in the preferred implementation is one in which a model fitting error is balanced with an overall complexity of the model. The sum of the statistical residuals of each segment $S_i$ is used as the model fitting error. Combining Equations (20), (21), (22) and (23), the residual over segment $S_i$ as a function of the model parameters $\alpha_i$ is given by $$E_i(a_i) = \sum_{(x,y,n) m S_i} [\phi(x, y, n) - a_i]^T [\phi(x, y, n) - a_i] \quad (24)$$

A partition into segments $S_i$ may be compactly described by a binary function $J(d)$, in which the value one (1) is assigned to each boundary pixel bordering a segment $S_i$. This function $J(d)$ is referred to as a boundary map. The model complexity is simply the number of segment-bounding elements d. Hence the overall cost frictional E may be defined as $$E(\gamma, J, \lambda) = \sum_i E_i(a_i) + \lambda \sum_d J(d), \quad (25)$$

where the (non-negative) parameter $\lambda$ controls the relative importance of model fitting error and model complexity The contribution of the model fitting error to the cost functional E encourages a proliferation of segments, while the model complexity encourages few segments. The functional E must therefore balance the two components to achieve a reasonable result. The aim of variational segmentation is to find a minimising model vector $\overline{\gamma}$ and a minimising boundary map $\overline{J}(d)$ of the overall cost functional E, for a given parameter $\lambda$ value.

Note that if the segment boundaries d are given as a valid boundary map $J(d)$, the minimising model parameters $\overline{\alpha}_i$ over each segment $S_i$ may be found by minimising the segment residuals $E_i$. This may be evaluated using a simple weighted linear least squares calculation. Given this fact, any valid boundary map $J(d)$ will fully and uniquely describe a segmentation. Therefore, the cost function E may be regarded as a function over the space of valid edge maps (J-space), whose minimisation yields an optimal segment partition $\overline{J}_\lambda$ for a given parameter $\lambda$. The corresponding minimising model parameters $\overline{\alpha}_i$ may then be assumed to be those which minimise the residuals $E_i$ over each segment $S_i$. The corresponding minimum residuals for segment $S_i$ will hereafter be written as $\overline{E}_i$.

If parameter $\lambda$ is low, many boundaries are allowed, giving "fine" segmentation. As parameter $\lambda$ increases, the segmentation gets coarser. At one extreme, the optimal segment partition $\overline{J}_o$, where the model complexity is completely discounted, is the trivial segmentation, in which every pixel constitutes its own segment $S_i$, and which gives zero model fitting error e. On the other hand, the optimal segment partition $\overline{J}_o$, where the model fitting error e is completely discounted, is the null or empty segmentation in which the entire block is represented by a single segment $S_i$. Somewhere between these two extremes lies the segmentation $\overline{J}_\lambda$, which will appear ideal in that the segments $S_i$ correspond to a semantically meaningful partition.

To find an approximate solution to the variational segmentation problem, a segment merging strategy has been employed, wherein properties of neighbouring segments $S_i$ and $S_j$ are used to determine whether those segments come from the same model state, thus allowing the segments $S_i$ and $S_j$ to be merged as a single segment $S_{ij}$. The segment residual $E_{ij}$ also increases after any 2 neighbouring segments $S_i$ and $S_j$ are merged.

Knowing that the trivial segmentation is the optimal segment partition $\overline{J}_\lambda$ for the smallest possible parameter $\lambda$ value of 0, in segment merging, each voxel in the block is initially labelled as its own unique segment $S_i$, with model parameters are set to the colour values $\phi(x,y,n)$. Adjacent segments $S_i$ and $S_j$ are then compared using some similarity criterion and merged if they are sufficiently similar. In this way, small segments take shape, and are gradually built into larger ones.

The segmentations $\overline{J}_\lambda$ before and after the merger differ only in the two segments $S_i$ and $S_j$. Accordingly, in determining the effect on the total cost functional E after such a merger, a computation may be confined to those segments $S_i$ and $S_j$. By examining Equations (24) and (25), a merging cost for the adjacent segment pair $\{S_iS_j\}$ may be written as, $$\tau_{ij} = \frac{\overline{E}_{ij} - (\overline{E}_i + \overline{E}_j)}{l(\delta_{ij})} \quad (26)$$

where $l(\delta_{ij})$ is the area of the common boundary between three-dimensional segments $S_i$ and $S_j$. If the merging cost $\tau_{ij}$ is less than parameter $\lambda$, the merge is allowed.

The key to efficient segment growing is to compute the numerator of the merging cost $\tau_{ij}$ as fast as possible. Firstly, Equation (24) is rewritten as:

$$E_j(\alpha_j) = (F_j - H_j \alpha_j)^T (F_j - H_j \alpha_j) \quad (27)$$

where:

$H_j$ is an $(v_j c)$ by $c$ matrix composed of the $c$ by $c$ identity matrices stacked on top of one another as $(x,y,n)$ varies over segment $S_j$, with $v_j$ the number of voxels in segment $S_j$; and $F_j$ is a column vector of length $(v_j c)$ composed of the individual colour value $\phi(x,y,n)$ vectors stacked on top of one another.

By weighted least square theory, the minimising model parameter vector $\overline{\alpha}_j$ for the segment $S_j$ is given by the mean of the colour value $\phi(x,y,n)$ over segment $S_j$.

Let $\kappa_j$ be the confidence in the model parameter estimate $\overline{\alpha}_j$, defined as the inverse of its covariance:

$$\kappa_j = \Lambda_j^{-1} = H_j^T H_j \quad (28)$$

which simply evaluates to $v_j I_c$. The-corresponding residual is given by $$\overline{E}_j = (F_j - H_j \overline{\alpha}_j)^T (F_j - H_j \overline{\alpha}_j) \quad (29)$$

When merging two segments $S_i$ and $S_j$, the "merged" matrix $H_{ij}$ is obtained by concatenating matrix $H_i$ with matrix $H_j$; likewise for matrix $F_{ij}$. These facts may be used to show that the best fitting model parameter vector $\overline{\alpha}_{ij}$ for the merged segment $S_{ij}$ is given by:

$$\overline{\alpha}_{ij} = \frac{(v_i \overline{\alpha}_i - v_j \overline{\alpha}_j)}{v_i + v_j} \quad (30)$$

and the merged confidence is;

$$\kappa_{ij} = \kappa_i + \kappa_j = v_{ij} I_c \quad (31)$$

The merged residual is given by:

$$\overline{E}_{ij} = \overline{E}_i + \overline{E}_j + (\overline{\alpha}_i - \overline{\alpha}_j)^T (\overline{\alpha}_i - \overline{\alpha}_j) \frac{v_i v_j}{v_i + v_j}. \quad (32)$$

The merging cost $\tau_{ij}$ in Equation (26) may be computed as:

$$\tau_{ij} = \frac{\|\overline{\alpha}_i - \overline{\alpha}_j\|^2 \frac{v_i v_j}{v_i + v_j}}{l(\delta_{ij})} \quad (33)$$

from the model parameters and confidences of the segments $S_i$ and $S_j$ to be merged. If the merge is allowed, Equations (30) and (31) give the model parameter $\overline{\alpha}_{ij}$ and confidence $\kappa_{ij}$ of the merged segment $S_{ij}$.

During segment-merging segmentation, the merging of segments must stop once the merging cost $\tau_{ij}$ exceeds a predetermined threshold $\lambda_{stop}$. Note that under this strategy, only Equations (30), (31), and (33) need to be applied throughout the merging process. Only the model parameters $\overline{\alpha}_i$ and their confidences $\kappa_i$ for each segment $S_i$ are therefore required as segmentation proceeds. Further, neither the original colour values $\phi(x,y,n)$ nor the model structure itself (i.e. the matrices $A(x,y,n)$) are required.

Figure 7:
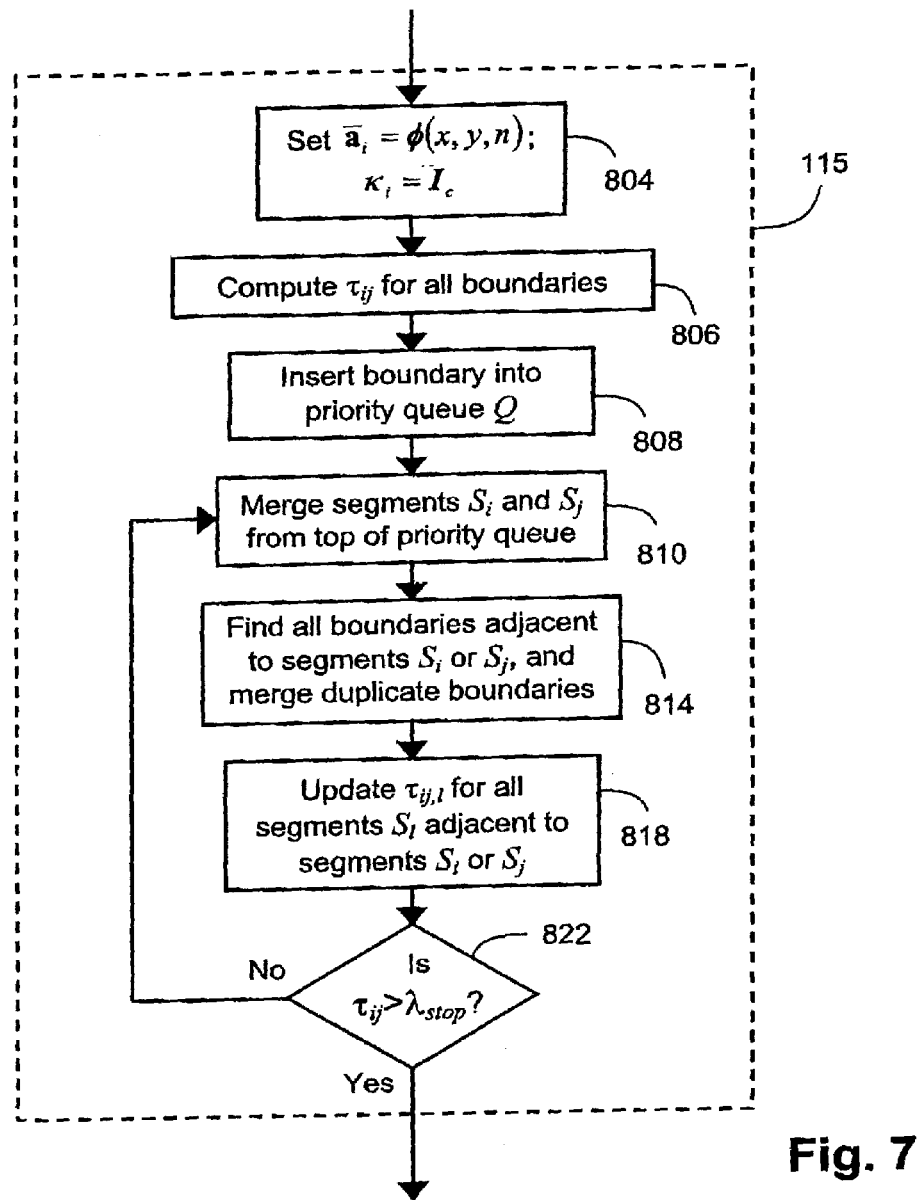
FIG. 7 shows a flow diagram of the sub-steps of a 3D-segmentation step.

FIG. 7 shows the 3D segmentation step 115 (FIG. 1) in more detail. The 3D segmentation step 115 starts in sub-step 804 which sets the model parameters $\overline{\alpha}(x,y,n)$ to the colour values $\phi(x,y,n)$, and the model confidences $\kappa(x,y,n)$ to the identity matrix $I_c$ for each voxel in the block of L+1 frames. The 3D segmentation starts with the trivial segmentation where each voxel forms its own segment $S_i$. Sub-step 806 then determines all adjacent segment pairs $S_i$ and $S_j$, and computes the merging cost $\tau_{ij}$ according to Equation (33) for each of the boundaries between adjacent segment pairs $S_i$ and $S_j$. Sub-step 808 inserts the boundaries with merging cost $\tau_{ij}$ into a priority queue Q in priority order.

Sub-step 810 takes the first entry from the priority queue Q(1) and merges the corresponding segment pair $S_i$ and $S_j$ (i.e. the segment pair $S_i$ and $S_j$ with the lowest merging cost $\tau_{ij}$) to form a new segment $S_{ij}$.

Sub-step 814 identifies all boundaries between segments $S_l$ adjoining either of the merged segments $S_i$ and $S_j$, and merges any duplicate boundaries, adding their areas. Sub-step 818 follows where the processor 705 calculates a new merging cost $\tau_{ij,1}$ for each boundary between adjacent segments $S_{ij}$ and $S_l$. The new merging costs $\tau_{ij,1}$ effectively reorder the priority queue Q into the final sorted queue in sub-step 818.

Sub-step 818 passes control to sub-step 822 where the processor 705 determines whether the merging cost $\tau_{ij}$ corresponding to the segments $S_i$ and $S_j$ at the top of the priority queue Q (entry Q(1)) has a value greater than a predetermined threshold $\lambda_{stop}$, which signifies the stopping point of the merging. If the merging has reached the stopping point, then the 3D segmentation step 115 ends. Alternatively, control is returned to sub-step 810 from where sub-steps 810 to 822 are repeated, merging the two segments with the lowest merging cost $\tau_{ij}$ every cycle, until the stopping point is reached.

Referring again to FIG. 6, as noted previously, when frame data of a new frame is received in step 115 (FIG. 1), the new frame is added to the window 600, while the oldest frame in the window 600 is removed from the block of pixel data. The 3D segmentation step 115 is performed as each new frame is received in step 105. However, after the 3D segmentation step 115 described with reference to FIG. 7 has been performed a first time, in subsequent execution of the 3D segmentation step 115, the segments $S_i$ formed in a previous segmentation are maintained in sub-step 804, with only the model parameters $\overline{\alpha}(x,y,n)$ and model confidences $\kappa(x,y,n)$ of the new fame being set to the colour values $\phi(x,y,n)$ and the identity matrix $I_c$ respectively. The effect of the 3D segmentation step 115 is thus to merge the unsegmented pixels of the new frame into the existing segments $S_i$ from a previous segmentation. Those existing segments $S_i$ from a previous segmentation may adjust due to the information contained in the new frame.

Segment Pre-Filtering

Figure 9:
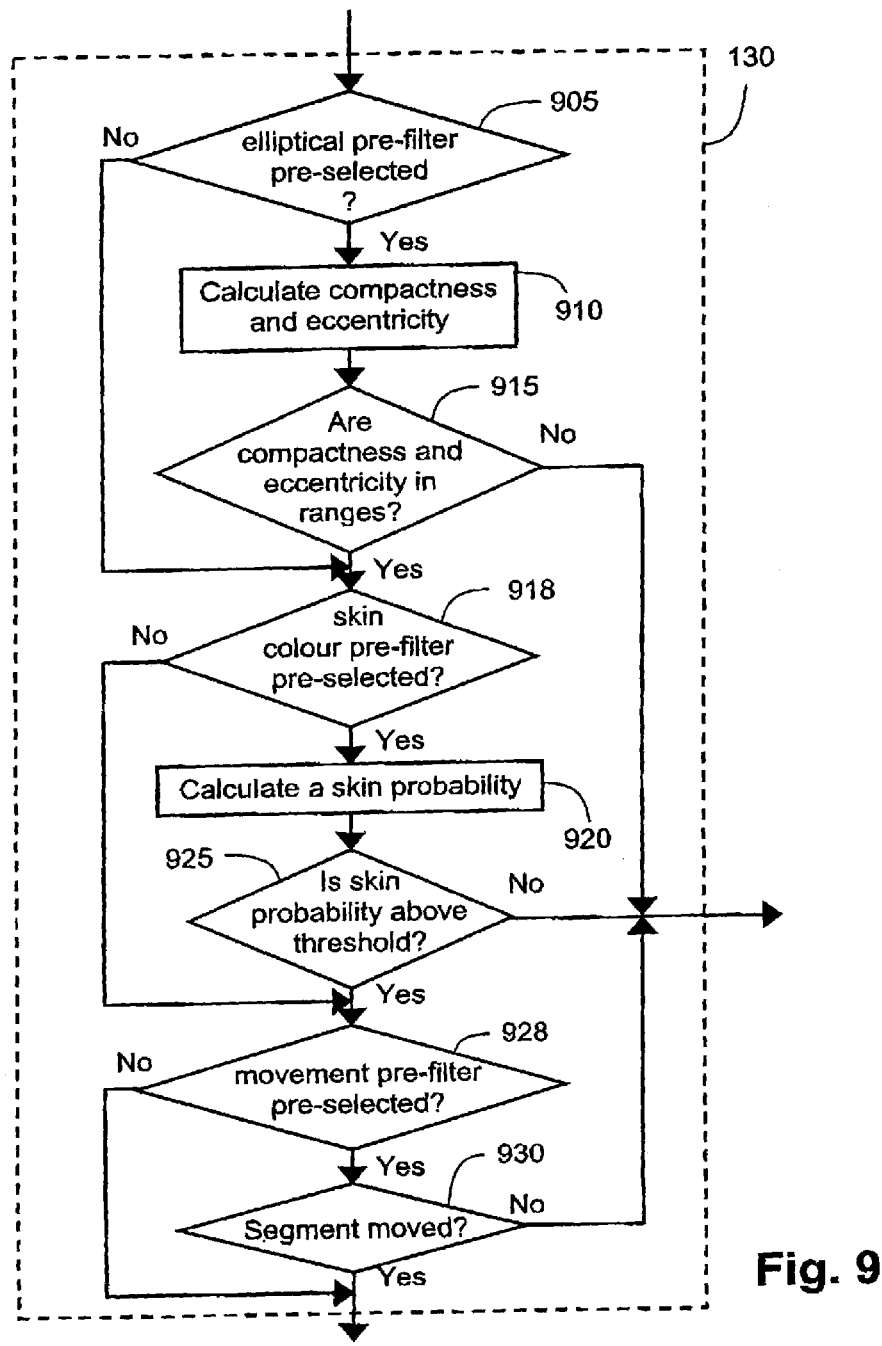
FIG. 9 shows a flow diagram of the sub-steps of a segment pre-filtering step.

Step 130 (FIG. 2) which determines whether the segment $s_{ti}$ satisfies a number of pre-filtering criteria, so that segments $s_t^i$ that are likely not to correspond to a human face may be omitted from further processing, will now be described in more detail. FIG. 9 shows a flow diagram of the sub-steps of step 130.

In the preferred implementation the optional pre-filtering criteria include whether the segment $s_t^i$ selected in step 125 has an elliptical shape, whether the segment $s_t^i$ has the colour of skin, and whether or not the segment $s_t^i$ moves. Any number of the pre-filtering criteria may be pre-selected by the user of the method 100.

Typically, the head of a person can be modelled as an ellipse, with a ratio of 1.2 to 1.4 between the two principal axes of such an ellipse. Step 130 starts by determining in sub-step 905 whether an elliptical pre-filter has been pre-selected. If the elliptical pre-filter has been pre-selected, processor 705 determines whether the segment $s_t^i$ selected in step 125 has an elliptical shape. In particular, in sub-step 910 the processor 705 calculates estimates of the compactness and the eccentricity of the 2D segment $s_t^i$, with the compactness being the ratio of the perimeter of segment $s_t^i$ against the area of segment $s_t^i$, and the eccentricity being the ratio of the width of segment $s_t^i$ against the height of segment $s_t^i$. The processor 705 then determines in sub-step 915 whether the compactness and the eccentricity of the segment $s_t^i$ fall within predefined ranges. If either of the compactness or the eccentricity of the segment $s_t^i$ does not fall within the predefined ranges, then the segment $s_t^i$ is not elliptical and is therefore not considered any further. Step 130 ends and method 100 (FIG. 2) continues to step 160 (FIG. 2).

Another property of a human face is that the colour of human skin is distinctive from the colour of many other natural objects. By analysing skin colour statistics, one observes that human skin colour is distributed over a small area in the chrominance plane. Furthermore, colour is orientation invariant under certain lighting conditions, robust under partial occlusion, rotation, scale changes and resolution changes. Accordingly, if the segment $s_t^i$ is determined to be elliptical, or from sub-step 905 if the elliptical pre-filter has not been pre-selected, it is then determined in sub-step 918 whether a skin colour pre-filter has been preselected. If the skin colour pre-filter has been preselected, then it is determined whether the segment $s_t^i$ has the colour of skin.

Sub-step 920 calculates the Mahalanobis distance between the average colour value of the segment $s_t^i$ in the predefined colour space (after step 110) and a predetermined skin colour model. The predetermined skin colour model is created by extracting colour values from skin pixels from several images that contain faces. A mean $\mu$ and covariance matrix $\Sigma$ of the colour values are calculated, thereby obtaining statistical measures representing those colour values. It is noted that all or a sub-group of the components of the colour space may be used in sub-step 920. For example, when using the CIE Luv colour space, all three Luv components may be used, or alternatively, the luminance L component may be ignored.

With $z_i$ being the average colour value of segment $s_t^i$, the Mahalanobis distance $D_M(z_1)$ for segment $s_t^i$ is defined as:

$$D_M(z_i) = (z_i - \mu)\Sigma^{-1}(z_i - \mu) \quad (34)$$

Values for the Mahalanobis distance $D_M(z_i)$ vary between zero and infinity. A membership function Mf is used to transfer the Mabalanobis distance $D_M(z_i)$ to a skin probability as follows:

$$\begin{cases} Mf(D_M(z_i)) = 1 & \text{if } D_M(z_i) \leq val1 \\ Mf(D_M(z_i)) = 0 & \text{if } D_M(z_i) \geq val2 \\ Mf(D_M(z_i)) = \dfrac{D_M(z_i) - val2}{val1 - val2} & \text{if } val1 < D_M(z_i) < val2 \end{cases} \quad (35)$$

with val1 and val2 being predetermined values. In the preferred implementation the predetermined values are val1=2 and val2=2,5.

Sub-step 925 determines whether the skin probability is above a predetermined threshold. If the skin probability is below the threshold, then the segment $s_t^i$ is not skin coloured and is therefore not considered any further. Step 130 ends and method 100 (FIG. 2) continues to step 160 (FIG. 2).

Yet another observation is that most non-moving segments $s_t^i$ belong to the background and therefore have a low probability of containing a human face. Accordingly, if sub-step 925 determines that the segment $s_t^i$ is skin coloured, or if sub-step 918 determines that the skin-colour pre-filter has not been pre-selected, then the processor 705 determines in sub-step 928 whether or not a movement pre-filter has been pre-selected. If the movement pre-filter has been pre-selected, then it is determined whether or not the segment $s_t^i$ moves. Any technique may be used in order to decide whether or not a segment $s_t^i$ moves. In a specific implementation, a static camera 750 is assumed, and sub-step 930 determines whether the centroid of the segment $s_t^i$ moved more than a predetermined number of pixels, such as 10. If sub-step 930 determines that the centroid of the segment $s_t^i$ did not move more than the predetermined number of pixels, then the segment $s_t^i$ is deemed to be background and is therefore not considered any further. Step 130 ends and method 100 (FIG. 2) continues to step 160 (FIG. 2).

Alternatively, if sub-step 930 determines that the centroid of the segment $s_t^i$ did move more than the predetermined number of pixels, or sub-step 928 determined that the movement pre-filter has not been selected, then step 130 ends and method 100 (FIG. 2) continues to step 140 (FIG. 4).

The foregoing describes only some embodiments of the present invention, and modifications and/or changes can be made thereto without departing from the scope and spirit of the invention, the embodiments being illusive and not restrictive.

I claim:

1. A method of detecting and tracking human faces across a sequence of video frames, said method comprising the steps of:
    (a) forming a 3D pixel data block from said sequence of video frames;
    (b) segmenting said 3D data block into a set of 3D segments using 3D spatiotemporal segmentation;
    (c) forming 2D segments from an intersection of said 3D segments with a view plane, each 2D segment being associated with one 3D segment;
    (d) in at least one of said 2D segments, extracting features and grouping said features into one or more groups of features;
    (e) for each group of features, computing a probability that said group of features represents human facial features based on the similarity of the geometry of said group of features with the geometry of a human face model;
    (f) matching at least one group of features with a group of features in a previous 2D segment and computing an accumulated probability that said group of features represents human facial features using probabilities of matched groups of features;
    (g) classifying each 2D segment as a face segment or a non-face segment based on said accumulated probability of at least one group of features in each of said 2D segments; and
    (h) tracking said human faces by finding an intersection of 3D segments associated with said face segments with at least subsequent view planes.

2. A method according to claim 1, wherein said features are regions in said 2D segment which are darker than the rest of said 2D segment.

3. A method according to claim 1, wherein said features are regions in said 2D segment having edges.

4. A method according to claim 1, wherein said group of features forms a triangle.

5. A method according to claim 1, wherein said method comprises the further steps of:
   determining, for each said 2D segment, a first measure of said 2D segment having a colour of human skin; and
   eliminating 2D segments having said first measure below a first predetermined threshold from further processing.

6. A method according to claim 1, wherein said method comprises the further step of:
   eliminating 2D segments having a form that is non-elliptical from further processing.

7. A method according to claim 1, wherein said method comprises the further steps of:
   determining movements of said 2D segments from positions of previous 2D segments associated with the same 3D segments; and
   eliminating 2D segments from further processing where said movement is below a second predetermined threshold.

8. An apparatus for detecting and tracking human faces across a sequence of video frames, said apparatus comprising:
   means for forming a 3D pixel data block from said sequence of video frames;
   means for segmenting said 3D data block into a set of 3D segments using 3D spatiotemporal segmentation;
   means for forming 2D segments from an intersection of said 3D segments with a view plane, each 2D segment being associated with one 3D segment;
   in at least one of said 2D segments, means for extracting features and grouping said feature's into one or more groups of features;
   for each group of features, means for computing a probability that said group of features represents human facial features based on the similarity of the geometry of said group of features with the geometry of a human face model;
   means for matching at least one group of features with a group of features in a previous 2D segment and computing an accumulated probability that said group of features represents human facial features using probabilities of matched groups of features;
   means for classifying each 2D segment as a face segment or a non-face segment based on said accumulated probability of at least one group of features in each of said 2D segments; and
   means for tracking said human faces by finding an intersection of 3D segments associated with said face segments with at least subsequent view planes.

9. An apparatus according to claim 8, wherein said features are regions in said 2D segment which are darker than the rest of said 2D segment.

10. An apparatus according to claim 8, wherein said features are regions in said 2D segment having edges.

11. An apparatus according to claim 8, wherein said group of features forms a triangle.

12. An apparatus according to claim 8, wherein said apparatus further comprises:
   means for determining, for each said 2D segment, a first measure of said 2D segment having a colour of human skin; and
   means for eliminating 2D segments having said first measure below a first predetermined threshold from further processing.

13. An apparatus according to claim 8, wherein said apparatus further comprises:
   means for eliminating 2D segments having a form that is non-elliptical from further processing.

14. An apparatus according to claim 8, wherein said apparatus further comprises:
   means for determining movements of said 2D segments from positions of previous 2D segments associated with the same 3D segments; and
   means for eliminating 2D segments from further processing where said movement is below a second predetermined threshold.

15. A computer-executable program stored on a computer readable storage medium, the program for detecting and tracking human faces across a sequence of video frames, said program comprising:
   code for forming a 3D pixel data block from said sequence of video frames;
   code for segmenting said 3D data block into a set of 3D segments using 3D spatiotemporal segmentation;
   code for forming 2D segments from an intersection of said 3D segments with a view plane, each 2D segment being associated with one 3D segment;
   in at least one of said 2D segments, code for extracting features and grouping said features into one or more groups of features;
   for each group of features, code for computing a probability that said group of features represents human facial features based on the similarity of the geometry of said group of features with the geometry of a human face model;
   code for matching at least one group of features with a group of features in a previous 2D segment and computing an accumulated probability that said group of features represents human facial features using probabilities of matched groups of features;
   code for classifying each 2D segment as a face segment or a non-face segment based on said accumulated probability of at least one group of features in each of said 2D segments; and
   code for tracking said human faces by finding an intersection of 3D segments associated with said face segments with at least subsequent view planes.

16. A program according to claim 15, wherein said features are regions in said 2D segment which are darker than the rest of said 2D segment.

17. A program according to claim 15, wherein said features are regions in said 2D segment having edges.

18. A program according to claim 15, wherein said group of features forms a triangle.

19. A program according to claim 15, wherein said program further comprises:
   code for determining for each said 2D segment, a first measure of said 2D segment having a colour of human skin; and
   code for eliminating 2D segments having said first measure below a first predetermined threshold from further processing.

20. A program according to claim 15, wherein said program further comprises:
   code for eliminating 2D segments having a form that is non-elliptical from further processing.

21. A program according to claim 15, wherein said program further comprises:
   code for determining movements of said 2D segments from positions of previous 2D segments associated with the same 3D segment; and
   code for eliminating 2D segments from further processing where said movement is below a second predetermined threshold.

* * * * *

UNITED STATES PATENT AND TRADEMARK OFFICE
CERTIFICATE OF CORRECTION

PATENT NO. : 7,146,028 B2
APPLICATION NO. : 10/410350
DATED : December 5, 2006
INVENTOR(S) : Fabrice Lestideau It is certified that error appears in the above-identified patent and that said Letters Patent is hereby corrected as shown below:

COLUMN 3:
Line 28, "(TOM)," should read -- (ROM), --;
Line 29, "1,0" should read -- I/0 --; and
Line 64, "of," should read -- of --.

COLUMN 4:
Line 54, "foamed," should read -- formed, --.

COLUMN 5:
Line 18, "has" should read -- have --; and
Line 35, "has" should read -- have --.

COLUMN 7:

Line 12, " $p_l = e^{-2a^1}$ " should read -- $p_l = e^{-2\alpha^2}$ --; and

Line 24, "cycline)," should read -- eyeline), --.

COLUMN 8:
Lines 28-32,
"
$$p_{s_1} = \begin{cases} 1 & \text{if} \quad X_c < \frac{2*Y}{3} \\ -\frac{3*Y_c}{Y} + 3 & \text{elsewhere} \end{cases}$$
"

should read
--
$$p_{s_1} = \begin{cases} 1 & \text{if} \quad X_c < \frac{2*Y}{3} \\ -\frac{3*X_c}{Y} + 3 & \text{elsewhere} \end{cases}$$
--.

UNITED STATES PATENT AND TRADEMARK OFFICE
CERTIFICATE OF CORRECTION

PATENT NO.       : 7,146,028 B2
APPLICATION NO.  : 10/410350
DATED            : December 5, 2006
INVENTOR(S)      : Fabrice Lestideau It is certified that error appears in the above-identified patent and that said Letters Patent is hereby corrected as shown below:

COLUMN 9:
Line 3, "$\lambda_5=0.1$." should read -- $\pi_5=0.1$.--.

COLUMN 10:
Lines 30-33,
"
$$P_I = \frac{\frac{P_I}{2} + \frac{Nd_I}{T\_life} + \frac{Nd_I}{S\_life}}{2}$$
"
should read
--
$$P_I = \frac{\frac{P_I}{2} + \frac{Nd_I}{T\_life} + \frac{Nd_I}{S\_life}}{3}$$
--.

Line 47, "0:75," should read -- 0.75, --; and
Line 52, "evaluated" should read -- evaluated. --.

COLUMN 11:
Line 58, "frictional" should read -- functional --.

COLUMN 12:
Line 58, "as," should read -- as: --.

COLUMN 13:
Line 21, "The-corresponding" should read -- The corresponding --;
Line 36, "is;" should read -- is: --; and
Line 60, "$\tau_y$" should read -- $\tau_{ij}$ --.

UNITED STATES PATENT AND TRADEMARK OFFICE
CERTIFICATE OF CORRECTION

PATENT NO. : 7,146,028 B2
APPLICATION NO. : 10/410350
DATED : December 5, 2006
INVENTOR(S) : Fabrice Lestideau It is certified that error appears in the above-identified patent and that said Letters Patent is hereby corrected as shown below:

COLUMN 14:
Line 47, "fame" should read -- frame --; and

Line 57, "$s_{ti}$" should read -- $s_t^i$ --.

COLUMN 16:
Line 32, "illusive" should read -- illustrative --.

COLUMN 17:
Line 33, "feature's" should read -- features --.

COLUMN 18:
Line 48, "determining" should read -- determining, --.

Signed and Sealed this

Fifteenth Day of December, 2009

David J. Kappos
*Director of the United States Patent and Trademark Office*